March 26, 1935.  A. SECCI  1,995,437

COLOR MOTION PICTURE CAMERA

Filed July 18, 1933   2 Sheets-Sheet 1

INVENTOR:

ARMENO SECCI.

By: Francis E. Boyce,

Attorney

March 26, 1935.  A. SECCI  1,995,437
COLOR MOTION PICTURE CAMERA
Filed July 18, 1933  2 Sheets-Sheet 2

INVENTOR:
ARMENO SECCI
BY Francis E. Boyce
ATTORNEY

Patented Mar. 26, 1935

1,995,437

UNITED STATES PATENT OFFICE 1,995,437

COLOR MOTION PICTURE CAMERA

Armeno Secci, Paris, France, assignor to Francita, Societe de Films en Couleurs Naturelles, Paris, France Application July 18, 1933, Serial No. 680,940
In France August 1, 1932

2 Claims. (Cl. 88—16.4)

Numerous methods and devices have already been proposed for the color kinematography, but these methods and devices have not already been used on a large scale on account of their imperfect results due either to insufficient coloring effects, or to the complicate or cumbersome optical systems, or to the necessity of using films having special dimensions, or to the impossibility of using projectors of usual construction.

Methods for bi-color kinematography have been proposed, but it has been experienced that, in order to obtain a true reproduction of the natural colors, it is necessary to form at least three images selected through three filters having complementary colors, such as red, green and blue for instance. Methods have even been proposed for obtaining images corresponding to more than three colors, but these methods require complicate optical systems or films with special dimensions, or provided with coatings having different sensibilities.

For the three color kinematography, it has been proposed to make successive series of groups of three images, these images being taken at short time intervals, but how little these intervals may be, the positions of the objects in the scene to be photographed vary continuously; consequently the three selected images are not quite identical and are thus not superposable. When these three images are projected simultaneously on the projection screen, the resulting image is not perfectly pure, due to the lack of superposition, and fringes of different colors are produced having a disagreeable effect on the eyes of the spectator.

It has also been proposed to make successive series of groups of three images taken simultaneously through three objectives which are necessarily at a distance from each other. The three images are consequently not taken from the same point of view and are consequently not identical nor superposable, and when said images are projected, the same drawbacks are produced as for the first method above described. Moreover, it is obvious that in such methods, it is necessary to use optical systems which are complicate in order to obtain simultaneously three images.

It has also been proposed to make successive series of groups of three images taken simultaneously through optical systems giving simultaneously three identical images of the same object and from one point of view. With this method, superposable and identical images are obtained, but it is necessary to use complicate optical systems; moreover, it is necessary to use films having special dimensions, or standard films which are driven then at the considerable speed of three standard images at a time, said condition requiring special driving mechanism and consequently no use can be made of the usual projectors commonly utilized in the playhouses for projecting the monochrome films.

It has also been proposed to take simultaneously two images from the same point of view and to take a third image either at the same time as the two first images or after the two first images. It is then necessary to use at least two different films or even three different films and consequently an equal number of feeding mechanisms for said films.

It is proposed, in the present invention, to obtain successive series of three images selected through three filters having red, green and blue colors, on a standard film adapted to be driven through an ordinary projector by means of an optical system as simple as possible and having relatively large objectives. For this purpose, use is made of the known fact according to which the fringes due to the projection of a blue image on two red and green images which are exactly superposable, do not affect in any disagreeable manner the eyes of the spectator, in contradistinction with the prejudicial effect produced when the red image or the green image is not superposable on the two other colored images.

With the motion picture camera according to the present invention, an optical system is used which produces simultaneously two identical and superposable images of the same object and from one point of view and disposed in such manner that two identical images are situated diagonally in a standard image area of a standard film, each intermittent displacement of said film being equal to half the height of a standard image of a standard film, and two groups of color filters, comprising the one a red filter and a green filter and the other a blue filter, are brought successively opposite said optical system, in such manner that two superposable images corresponding respectively to the red and green colors are recorded in said two diagonally disposed surfaces for one position of the film and of the filters, and that an image corresponding to the blue color is recorded on a free space in said same standard image area for the next position of the film and of the filters.

When it is desired to project a positive film obtained by said apparatus, the three images corresponding to the red, green and blue colors, are projected simultaneously on the screen, and the standard film is displaced after each projection on a distance corresponding to the height of a standard image. It is thus not necessary to modify the driving mechanism of the usual projector.

It is observed that, in the apparatus for taking the views, the two objectives are spaced at a distance from each other corresponding to the distance between said two diagonally disposed images, whereby a greater space is available for said objectives, and consequently use may be made of relatively large objectives.

Figure 1:
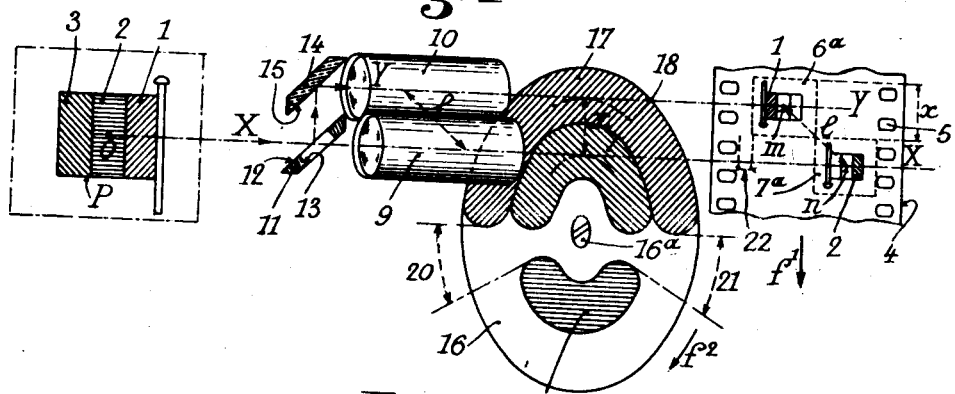
Fig. 1 is a diagrammatic perspective view, showing the relative positions of the subject, the camera and the negative film during the first exposure.

In the following description, it has been assumed that the subject is a waving tricolor flag: the stripe 1 situated along the staff is red, the central stripe 2 is blue and the outer stripe 3 is green. The colors are shown in the drawings, by a conventional cross-hatching.

The process according to the invention, as applied to motion pictures, consists in forming on a negative film 4 of standard size successive series of images, each comprising three images $6a$, $7a$, $8a$. In each series the images $6a$ and $7a$ are disposed diagonally of a standard image area of the film and are taken simultaneously through red and green filters respectively.

The image $8a$ is taken immediately thereafter, in the manner hereinafter described, through a blue screen.

The negative film used may be an homogenous panchromatic film, sensitized in all its points to the principal radiations of the spectrum; use may also be made of a heterogenous film, divided in zones corresponding to the areas of the selected images, the emulsion in each zone being sensitized to the radiations of the spectrum which correspond to the color of the particular selected image to be impressed in said zone. For instance, the film may comprise at the left hand a stripe in which the emulsion is sensitized to the red radiations, and at the right hand a stripe in which the emulsion is sensitized to the green and blue radiations.

In the example herein illustrated it is assumed for the sake of clearness that the subject comprises quite pure colors; in practice, for the various subjects of the nature, each image may reproduce substantially all the details of the subject, the actinic action on the film depending at each point upon the color of the corresponding point of the subject.

The centres of the different images $6a$, $7a$, $8a$, i. e. the images of the centre 0 of the subject are denoted by $m$, $n$, $p$.

The negative film above described is exposed in the camera which comprises two objectives 9 and 10, whose optical axes X—X and Y—Y are distant through an amount $l$, equal to the distance between the centres of two images such as $6a$ and $7a$, disposed diagonally of the film 4, and these objectives are so arranged that the axis X—X passes through the centre of the subject and that the trace upon the film 4 of the plane containing said axes X—X and Y—Y will coincide with the diagonal $mn$.

In front of the objective 9, and upon the axis X—X thereof, is arranged an opaque mirror 11, inclined at 45° upon said axis X—X and perpendicular to the plane of axes X—X and Y—Y. The reflecting surface 12 of said mirror 11 lies opposite the subject; said mirror is formed with a series of apertures 13 of rectangular shape or of any other shape (round, oval, rhombus-shaped or polygonal or in the shape of rectilinear, curved or spiral facets, etc.). Preferably the size of the perforations will be quite reduced, but large enough to prevent diffraction of the light which passes therethrough.

The total area of the perforations may be variable with respect to the area of the reflecting surfaces, depending on the sensitiveness of the film or film zones to the various colors. For the sake of simplicity, it will be supposed that these areas are substantially equal.

Upon the axis of the second objective 10 is arranged an opaque mirror 14, whose reflecting surface 15 is turned toward the objective 10. This second mirror 14 is parallel with mirror 11, whereby the light reflected by the latter is reflected in the direction of the optical axes YY of objective 10.

Behind the objectives 9 and 10 is mounted an opaque disc 16, rotatable about an axle $16a$. Said disc 16 is provided at one side with two concentric circular apertures, whose circular middle lines are distant radially through an amount $x$. Said apertures are provided respectively with a red transparent filter 17 and a green transparent filter 18. Disc 16 comprises a third transparent filter 19, colored in blue, and diametrically opposite filter 18. Two opaque sectors 20 and 21 separate filters 17, 18 from filter 19, whereby disc 16 also serves as an obturator.

The film 4 is displaced in an intermittent manner in the direction of arrow $f^1$ through a stroke equal to the distance $n\ p$ between the centres of the images $7a$ and $8a$ to be obtained, that is through half the height of a normal image area; otherwise stated, with a standard film having four perforations 5 per image area, the stroke of the film will be equal to two perforations. At each stroke $x$ of film 4, disc 16 performs half a revolution, in the direction of arrow $f^2$ for instance. For this purpose, on the rotatable axle $16a$ of disc 16 is secured a worm wheel 23 meshing with a worm wheel 24 secured on an axle 25, the diameter of wheel 23 being twice that of wheel 24. On the axle 25 is secured a disc 26 provided with a crank pin 27 on which is pivoted one end of a link 28, the other end of which is pivoted on an arm 29 pivoted on the fixed pin 30. The link 28 carries driving claws 31 adapted to be engaged into and removed from the perforations 5 of the film 4 guided in the gate 32.

The rate of the exposures may be as desired, preferably the standard rate of twenty four times the standard stroke $2x$ per second; the film will thus be fed through 48 strokes $x$ per second.

Figure 2:
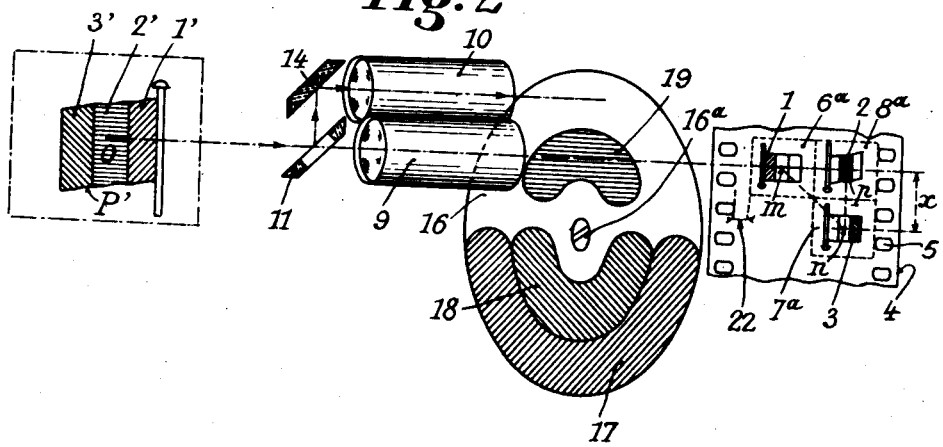
Fig. 2 is a similar view showing the positions of the parts during the next succeeding exposure.
Figure 3:
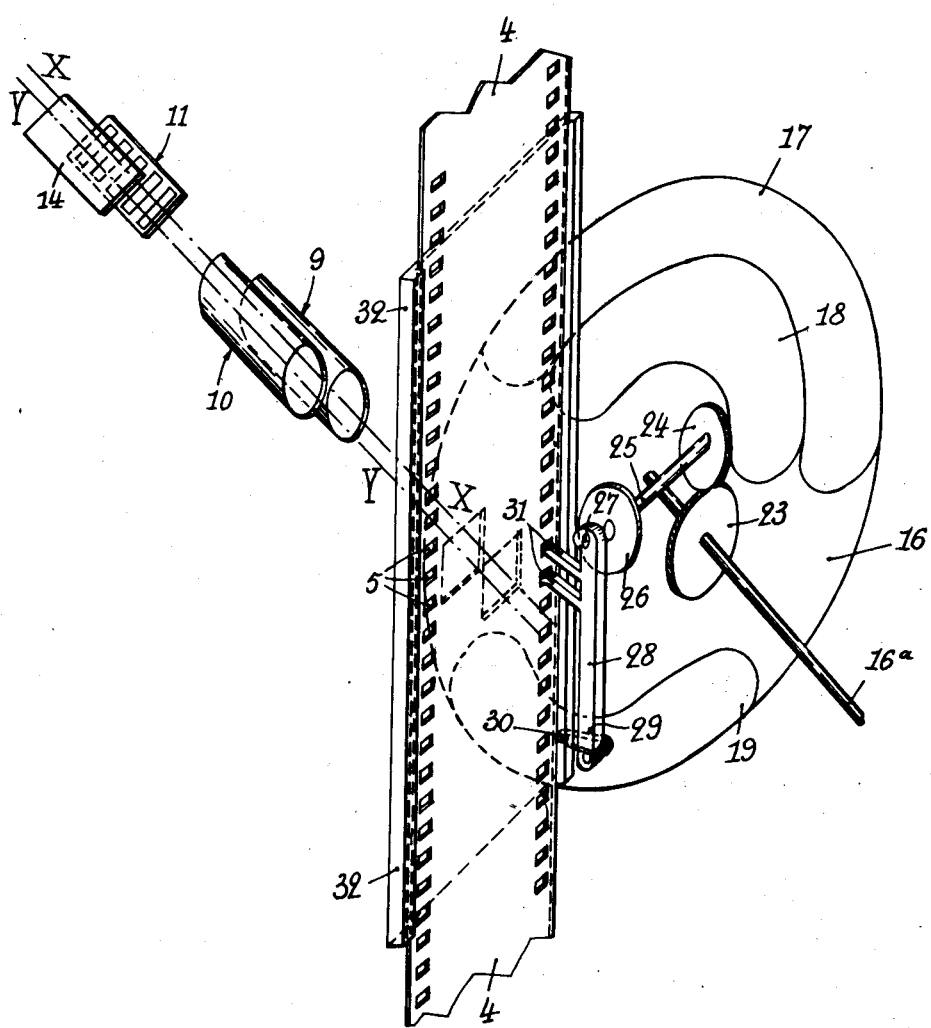
Fig. 3 is a diagrammatic perspective view of the driving mechanism for the film and the obturator.

The operation is as follows: the flag being in the position P (Fig. 1), the single light bundel issuing from said flag is divided by mirror 11 into two elementary bundels. One elementary bundel passes through the perforations 13, the objective 9, the green filter 18 and impresses the image $7a$, consisting mainly of the green stripe 2. The other bundel, which is identical with the former, except for the luminous intensity, is reflected by the mirrors 11 and 14, passes through the objective 10 and the filter 17 and impresses the image $6a$, consisting mainly of the red stripe 1. Disc 16 is then rotated through $180a$ and, as one of the sectors 20 or 21, acting as an obturator, intercepts the light to the film 4, said film is fed in the direction of arrow $f^1$ through the stroke $x$, while the flag comes into the position P' (Fig. 2). The light bundel issuing from said flag passes through the apertures 13 of mirror 11, the blue filter 19 and impresses the image $8^a$ (consisting mainly of the blue stripe 3), while the light bundel, which is reflected by mirrors 11 and 13, is intercepted by the opaque marginal portion of disc 16.

The exposures proceed similarly for the other successive series of images.

On the negative film, a narrow band 22 may be left for a sound record. The film is then developed and, from the negative thus obtained, positive copies are taken by the usual processes and the three images of each series of said positive film are simultaneously projected through corresponding red, green and blue filters upon a screen.

Having now described my invention what I claim as new and desire to secure by Letters Patent is:

1. In a motion picture camera, a gate adapted to guide a film of a standard width, a film feeding mechanism adapted to displace said film in said gate intermittently through half the height of a standard image area, means for dividing the light bundel entering the camera into two elementary parallel light bundels adapted to be projected on two partial areas disposed diagonally in a standard image area of the film, whereby two images of the same object and of the same point of view are adapted to be projected upon said two diagonally disposed partial areas, a movable member carrying on one hand a red filter and a green filter and on the other hand a blue filter and adapted to assume two different positions, the one in which the red and green filters are in the paths of said elementary light bundels and the other in which the blue filter is in the path of one of said elementary light bundels, and means adapted to be operated in timed relation with said film feeding mechanism and adapted to bring successively said movable member into said two positions, whereby two images corresponding respectively to the red and green filters are projected simultaneously on the two diagonally disposed partial areas of a standard image area for one position of the film and of the movable member, and an image corresponding to the blue filter is projected separately on another partial area of the same standard image area for the next position of the film and of the movable member.

2. In a motion picture camera, a gate adapted to guide a film of a standard width, a film feeding mechanism adapted to displace said film in said gate intermittently through half the height of a standard image area, two objectives whose optical axes are parallel and adapted to project images on two partial areas disposed diagonally in a standard image area of the film, a pair of parallel reflecting surfaces facing each other and inclined with relation to the optical axes of said objectives, one reflecting surface being perforated and adapted to divide the light bundel entering the camera into two elementary light bundels, the first elementary bundel being reflected towards the other reflecting surface and the secondard elementary bundel having free passage through said perforated reflecting surface towards one of said objectives, the other reflecting surface being adapted to reflect the light bundel issuing from the first reflecting surface towards the other objective, whereby two images of the same object and of the same point of view are adapted to be projected upon said two diagonally disposed partial areas, a movable member carrying on one hand a red filter and a green filter and on the other hand a blue filter and adapted to assume two different positions, the one in which the red and green filters are in the paths of said elementary light bundels and the other in which the blue filter is in the path of one of said elementary light bundels, and means adapted to be operated in timed relation with said film feeding mechanism and adapted to bring successively said movable member into said two positions, whereby two images corresponding respectively to the red and green filters are projected simultaneously on the two diagonally disposed partial areas of a standard image area for one position of the film and of the movable member, and an image corresponding to the blue filter is projected separately on another partial area of the same standard image area for the next position of the film and of the movable member.

ARMENO SECCI.